United States Patent [19]

Wener

[11] Patent Number: 5,666,875
[45] Date of Patent: Sep. 16, 1997

[54] DOUBLE ROASTING PAN

[75] Inventor: Gerald M. Wener, Memphis, Tenn.

[73] Assignee: W & C Investments, Memphis, Tenn.

[21] Appl. No.: 650,860

[22] Filed: May 20, 1996

[51] Int. Cl.$^6$ .................................................. A47J 37/10
[52] U.S. Cl. .......................... 99/422; 99/426; 220/4.24; 220/912
[58] Field of Search .................. 99/422, 424, 426; 220/4.24, 4.25, 4.21, 912

[56] References Cited

U.S. PATENT DOCUMENTS

| | | | |
|---|---|---|---|
| 229,314 | 6/1880 | Henderson | 220/4.21 |
| 1,103,169 | 7/1914 | Beam | 220/4.21 |
| 1,683,603 | 9/1928 | Canfield | 220/4.21 |
| 2,061,610 | 11/1936 | Burnette | 220/4.21 |
| 2,289,037 | 7/1942 | Poglein | 220/4.24 X |
| 2,704,974 | 3/1955 | Setmen | 99/422 |
| 2,722,173 | 11/1955 | Cunningham | 99/428 |
| 2,920,682 | 1/1960 | Lindberg | 220/4.24 X |
| 4,216,763 | 8/1980 | Miklas | 220/4.24 X |
| 4,286,713 | 9/1981 | Marchais | 206/508 |
| 5,065,889 | 11/1991 | Conti | 220/366 |
| 5,307,951 | 5/1994 | Kuhn | 220/771 |
| 5,332,114 | 7/1994 | Sano et al. | 220/4.24 |
| 5,356,023 | 10/1994 | Krupa | 220/4.24 |

Primary Examiner—Reginald Alexander
Attorney, Agent, or Firm—Walker, McKenzie & Walker, P.C.

[57] ABSTRACT

A double roasting pan that has identical pan halves that fit together to form the double roasting pan. There are diagonally arranged protrusions and recesses provided on the pan halves which fit together to prevent shifting of the pan halves relative to each other. Even if the pan halves are turned into either one of two positions 180° relative to one another they will still fit. The protrusions and recesses on each pan half are "axially symmetrical" relative to the particular pan half. Rigid handles are provided on the pan halves with the handles being incorporated into the one piece construction of the pan halves, and disposed so that when the pan halves are placed together to form the double roasting pan the flanges on the handles of one of the pan halves are spaced from the flanges on the handles of the other of the pan halves so that room is provided to accommodate a gloved or mitted hand of the user when picking up the top one of the pan halves.

11 Claims, 1 Drawing Sheet

DOUBLE ROASTING PAN

BACKGROUND OF THE INVENTION

1. Field of the Invention

The present invention relates, in general, to double roasting pans.

2. Information Disclosure Statement

Double roasting pans are typically provided with a roasting pan top and a roasting pan bottom. The roasting pan bottom in which the cooking is done is typically larger than the roasting pan top which serves as the cover or top of the double roasting pan. To align and prevent shifting of the top pan relative to the bottom pan the top cover fits into a ledge or groove in the bottom pan, or the typical bottom pan is provided with upstanding lugs at the sides and ends thereof which extend upwardly beyond the upper edge of the bottom pan and between which the lower edge of the top pan are received when two pans are joined as a double roasting pan. If either the top or the bottom pan wears out and the other pan is still in good repair, in order to have an operable double roasting pan it is necessary for the consumer to replace the entire roasting pan, that is, by buying both the top and the bottom pans. Consequently, it is desirable to have a roasting pan in which it is not necessary to replace both top and bottom pans when one of the pans wears out.

Also, typical roasting pans have swing type hinged handles which, when not in use, swing downwardly alongside of the pans. Then, when it is desired to use the handles for lifting the pans, it is necessary to swing the handles upwardly and outwardly. This presents difficulties during the manipulation of the handles to swing them upwardly away from the pan, particularly when bulky mittens and other pan holders are used to prevent burning of the user's hands. Thus, it is desirable to have a roasting pan with handles that are easy to use and require no manipulation or swinging for the use thereof.

A preliminary patentability search in Class 99, subclass 422; and class 220, subclasses 4.21, 386 and 912 produced the following patents, some of which may be relevant to the present invention: Henderson, U.S. Pat. No. 229,314, issued Jun. 29, 1880; Beam, U.S. Pat. No. 1,103,169, issued Jul. 14, 1914; Canfield, U.S. Pat. No. 1,683,603, issued Sep. 11, 1928; Burnette, U.S. Pat. No. 2,061,610, issued Nov. 24, 1936; Setman, U.S. Pat. No. 2,704,974, issued Mar. 29, 1955; Cunningham, U.S. Pat. No. 2,722,173, issued Nov. 1, 1955; Marchais, U.S. Pat. No. 4,286,713, issued Sep. 1, 1981; Conti, U.S. Pat. No. 5,065,889, issued Nov. 19, 1991; and, Kuhn, U.S. Pat. No. 5,307,951, issued May 3, 1994.

SUMMARY OF THE INVENTION

The present invention is an improved double roasting pan which has identical pan halves that fit together to form the double roasting pan even if turned into either one of two positions 180° relative to one another. The identical pan halves can be rectangular, square, round, or oval in shape.

It is an object of the present invention to provide such a double roasting pan so that if either the bottom pan or the top pan wears out or needs replacing it is not necessary to replace the entire roasting pan but only the particular pan half that needs replacing.

A further object is to provide such a double roasting pan in which each of the pan halves may either be used as a bottom pan half for cooking or may be used as an top pan half for covering the bottom pan half, and if a person desires only a pan half for cooking without a top half, it is only necessary to purchase one pan half and not the entire double roasting pan.

It is a further object of the present invention to provide very effective and unique means for limiting the shifting of the pan halves relative to one another when joined together.

A still further object is to provide cooperating protrusion means and recess means respectively disposed on the pan halves for guiding the pan halves into place relative to one another to establish the double roasting pan and for limiting shifting of the pan halves from side-to-side and from end-to-end relative to one another after the pan halves are in place.

An additional object is to arrange the protrusion means and the recess means in a diagonal pattern relative to the double roasting pan so that the top pan half and the bottom pan half may be identical in construction and yet fit together to establish the double roasting pan. Even if the pan halves are turned into either one of two positions 180° relative to one another they will still fit.

Another object of the present invention is to provide improved fixedly mounted handles for a double roasting pan that are rigid in construction and have lifting portions on the upper pan half and the lower pan half that are spaced apart to allow the pan halves to be easily picked up even when bulky mittens or the like are used to prevent burning of the user's hands.

DESCRIPTION OF THE PREFERRED EMBODIMENT

Figure 1:
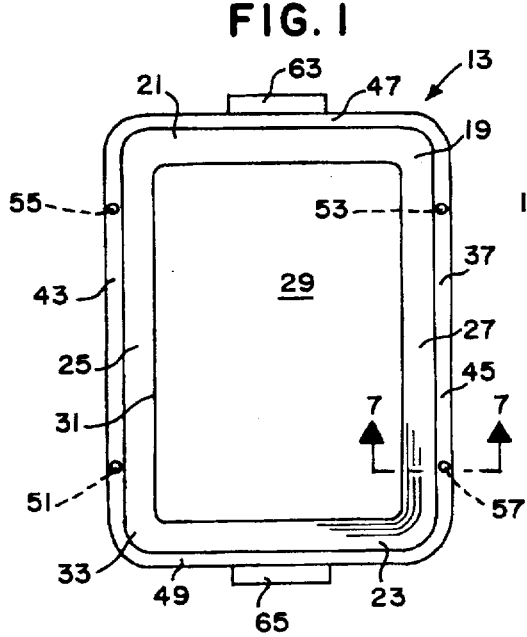
FIG. 1 is a top plan view of one of the pan halves of the present invention.

Referring now to the drawings, double roasting pan 11 is seen to comprise, in general, a first pan half 13 and a second pan half 113. First pan half 13 and second pan half 113 are identical in construction and the parts of second pan half 113 that correspond with the parts of first pan half 13 will be referred to herein and in the drawing by the same numeral used for referring to the parts of first pan half 13 but preceded by the numeral "1". First pan half 13 and second pan half 113 are removably fitted together to form the double roasting pan 11 having a first roasting pan end 15 and an opposite second roasting pan end 17.

For purposes of understanding, in the specification herein and in the drawing first pan half 13 will be described and shown as the top pan or cover portion of the double roasting pan 11 and second pan half 113 will be described and shown as the bottom or cooking portion of the double roasting pan 11, although it will be understood that the pan halves 13, 113 are interchangeable and either may be used as bottom pan or the top pan, or either one may be used alone as a cooking pan without a cover. It should be understood that the pan halves 13, 113 are each preferably, though not necessarily, of one piece construction as shown and described herein.

Figure 2:
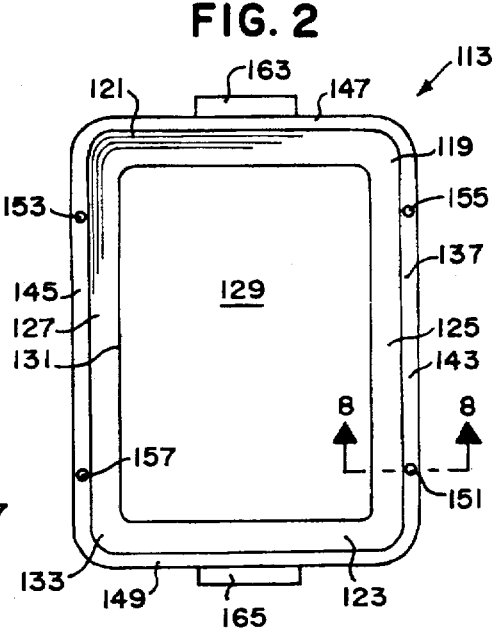
FIG. 2 is a plan view of another one of the pan halves of the present invention which is turned over relative to the one in FIG. 1.
Figure 3:
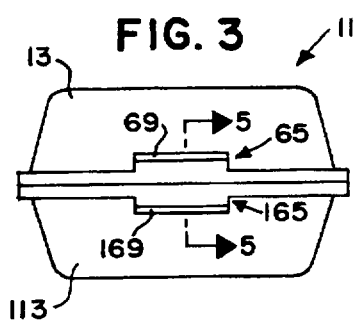
FIG. 3 is an end elevational view of the double roasting pan of the present invention.
Figure 4:
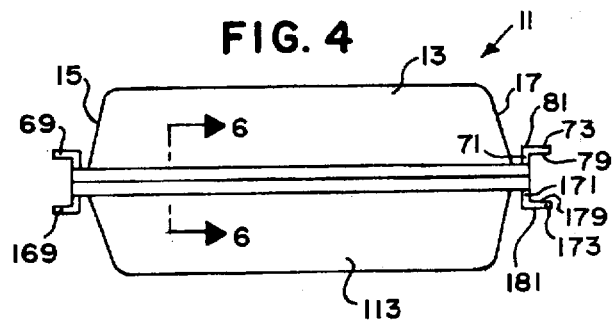
FIG. 4 is a side elevational view of the double roasting pan of FIG. 3.

In FIG. 2, pan half 113 is shown with the pan half 113 opening facing upwardly and in a position to receive pan half 13, which in FIG. 1 is in a position with the pan half 13 opening facing downwardly ready to be placed on pan half 113. In other words, in FIG. 1 the viewer is looking down on top of pan half 13 and in FIG. 2 the viewer is looking down into the open pan half 113. FIGS. 3 & 4 show the pan halves 13, 113 after pan half 13 has been placed on top of pan half 113 to establish the double roasting pan 11.

Pan half 13 preferably includes a body portion 19 having a first end 21 and an opposite second end 23, and having a first side 25 and a opposite second side 27. Body portion 19 includes a panel 29 having an edge 31 therearound, and includes a skirt portion 33 preferably integrally attached to panel portion 29 around edge 31 extending away from panel portion 29 and terminating in an open mouth portion 35. Also, pan half 13 includes a rim 37 attached to body portion 19 adjacent and around mouth portion 35. Rim 37 includes oppositely facing first and second surfaces 39, 41, a first rim portion 43 on first side 25 of body portion 19, a second rim portion 45 on second side 27 of body portion 19, a third rim portion 47 on first end 21 of body portion 19, and a fourth rim portion 49 on second end 23 of body portion 19. In addition, pan half 13 includes a first protrusion 51 attached to first rim portion 43 and extending outwardly (i.e., downwardly when pan half 13 is disposed as in FIG. 1) from second surface 41 of first rim portion 43, a second protrusion 53 attached to second rim portion 45 and extending outwardly (i.e., downwardly when pan half 13 is disposed as in FIG. 1) from second surface 41 of second rim portion 45, a first recess 55 in first rim portion 43 and extending outwardly (i.e., upwardly when pan half 13 is disposed as in FIG. 1) from second surface 41 of first rim portion 43, and a second recess 57 in second rim portion 45 and extending outwardly (i.e., upwardly when pan half 13 is disposed as in FIG. 1) from second surface 41 of second rim portion 45. Additionally, rim 37 includes a rim base portion 59 outwardly and horizontally extending from edge 31 of body portion 19, and an upstanding circumferential lip portion 61 attached to base portion 59 in spaced relationship to body portion 19.

First pan half 13 preferably includes a first rigid handle 63 and second rigid handle 65 respectively fixedly mounted on third rim portion 47 and fourth rim portion 49. Second handle 65 includes a vertically extending portion 67 fixedly and integrally attached to lip portion 61 at the upper end of the lip portion, and a horizontally extending flange 69 fixedly and integrally attached to vertically extending portion 67 at the distal or upper end of the vertically extending portion 67 and extending outwardly therefrom. Flange 69 has an inner surface 75 and an outer surface 77.

First handle 63 is substantially identical to second handle 65 and thus includes a vertically extending portion 71 fixedly and integrally attached to lip portion 61 at the upper end of the lip portion, and a horizontally extending flange 73 fixedly and integrally attached to vertically extending portion 71 at the distal or upper end of the vertically extending portion and extending outwardly therefrom. Flange 73 has an inner surface 79 and an outer surface 81.

It will be understood that although it is preferable to provide the pan halves 13,113 with the improved handles heretofore described, the pan halves 13, 113, if desired may be provided with the usual hinged type of handles well known to those skilled in the art without departing from the spirit and scope of the present invention. However, it is more difficult to pick up the pan halves when the hinged type of handles are used because the handles swing downwardly adjacent the ends of the pan halves causing difficulty to the user in getting his or her fingers between the handle and the pan to swing the handles outwardly in position to be grasped, particularly when mittens or the like are used. First and second protrusions 51, 53 are disposed diagonally from one another relative to body portion 19. Similarly first and second recesses 55, 57 are disposed diagonally from one another relative to body portion 19.

The following is the preferable arrangement of the protrusions 51, 53 and recesses 55, 57 relative to the pan half 13. First protrusion 51 and first recess 55 are spaced apart. Second protrusion 53 and second recess 57 are spaced apart substantially the same distance as the spacing between first protrusion 51 and first recess 55. First recess 55 and second protrusion 53 are spaced substantially an equal distance from first end 21 of body portion 19, and first protrusion 51 and second recess 57 are spaced substantially an equal distance from second end 23 of body portion 19. The distance of first recess 55 and second protrusion 53 from first end 21 of body portion 19 is substantially the same as the distance of first protrusion 51 and second recess 57 from second end 23 of body portion 19.

Stated another way, pan half 13, (including protrusions 51, 53 and recesses 55, 57), is "axially symmetric" about a vertical axis of symmetry passing through the intersection of the diagonals of pan half 13.

As previously stated pan halves 13, 113 are identical. Therefore, the following parts of second pan half 113 correspond to and are identical with the parts of pan half 13 of the same number designation without the suffix numeral "1": Body portion 119, first end 121 of body portion 119, second end 123 of body portion 119, first side 125 of body portion 119, second side 127 of body portion 119, panel 129, edge 131 of panel 129, skirt portion 133, open mouth portion 135, rim 137, first surface 139 of rim 137, second surface 141 of rim 137, first rim portion 143, second rim portion 145, third rim portion 147, fourth rim portion 149, first protrusion 151, second protrusion 153, first recess 155, second recess 157, rim base portion 159, lip portion 161, first handle 163, second handle 165, vertically extending portion 167 of second handle 165, flange 169 of second handle 165, vertically extending portion 171 of first handle 163, flange 173 of first handle 163, inner surface 175 of flange 169, outer surface 177 of flange 169, inner surface 179 of flange 173, and outer surface 181 of flange 173.

To use first pan half 13 and second pan half 113 in combination as a double roasting pan 11 and assuming the pan halves 13 and 113 are respectively in the positions shown in FIGS. 1 & 2, the first pan half 13 is simply lifted upwardly and brought over second pan half 113 with protrusions 51, 53, of first pan half 13 being respectively in alignment with recesses 157, 155 of second pan half 113 and with recesses 55, 57 of first pan half 13 being respectively in alignment with protrusions 153, 151 of second pan half 113. Then first pan half 13 is lowered on top of second pan half 113 into a first position of the pan halves relative to one another so that protrusions 51, 53, of first pan half 13 respectively extend into recesses 157, 155 of second pan half 113 and protrusions 153, 151 of second pan half 113 respectively extend into recesses 55, 57 of first pan half 13 to limit shifting of pan halves 13, 113 from side-to-side and end-to-end relative to one another. It will be understood that the pan halves 13, 113 may be turned to a second position relative to one another, in which said second position is 180° from said first position, and the pan halves will still fit together. Thus, in this case of said second position, protrusions 51, 53 of first pan half 13 will respectively extend into recesses 155, 157 of second pan half 113 and protrusions 153, 151 of second pan half 113 will respectively extend into recesses 57, 55 of first pan half 13.

Also, it will be understood that the protrusions 51, 53, 151 and 153 are preferably substantially identical and are tapered. Also, the recesses 55, 57, 155, and 157 are preferably substantially identical and correspondingly tapered to receive the protrusions therein in close fitting engagement. Also, it will be understood that during the placing of first pan half 13 on top of second pan half 113, if there is a slight misalignment between the two pan halves 13, 113, the taper on the protrusions interacting with the taper on the recesses will move the pan halves into exact alignment.

Figure 5:
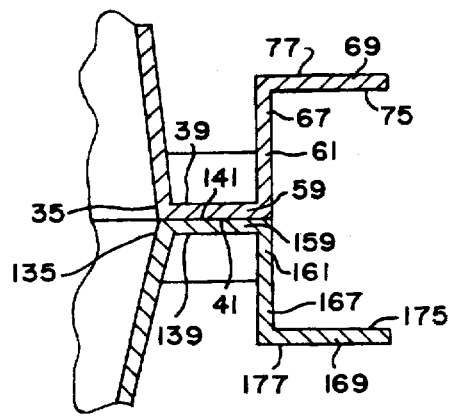
FIG. 5 is an enlarged sectional view taken as on the line 5—5 of FIG. 3.
Figure 6:
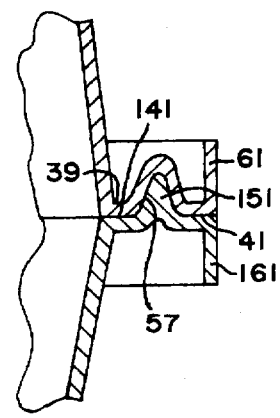
FIG. 6 is an enlarged sectional view taken as on line 6—6 of FIG. 4.
Figure 7:
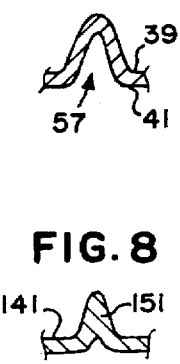
FIG. 7 is a fragmentary portion of that shown in FIG. 6 depicting one of the recesses.
Figure 8:
FIG. 8 is another fragmentary portion of that shown in FIG. 6 depicting one of the protrusions.

When the pan halves 13, 113 are placed together for use as a double roasting pan 11 as best seen in FIGS. 3, 4, & 5, the flanges 69 and 169, as well as the flanges 73, 173, will be spaced apart to allow bulky mittens or the like, used to prevent burning of the user's hands, to be inserted between the flanges 69 and 169 and flanges 73, 173 to pick up the uppermost pan half. It will be understood that to lift the pan half that is the upper pan half or the top one, which in the particular case shown in FIGS. 3 & 4 is first pan half 13, the inner surfaces 75 and 79 of the respective flanges 69, 73 are contacted and an upward pull is exerted thereon by the user's fingers. To lift both of the pan halves together it will be understood that the outer surfaces 177, 181 of the respective flanges 169, 173 are contacted and upward pull is exerted thereon by the user's fingers, and if it is desired to lift the lower one of the pan halves, e.g., second pan half 113 after the cover or first pan half 13 is removed therefrom, the respective flanges 169, 173 are contacted and upward pull is exerted thereon by the user's fingers. Also, if desired, the user's fingers can be extended beneath rim base portion 159 so that surface 139 may be used to exert an upward pull thereon.

From the foregoing it will be understood that the present invention provides an improved double roasting pan including identical pan halves which are prevented from shifting relative to one another and if either the bottom pan or the top pan wears out or needs replacing it is not necessary to replace the entire roasting pan but only the particular pan half that needs replacing. Also, it will be understood that such a double roasting pan is provided wherein each of the pan halves may either be used as a bottom pan half for cooking or may be used as an top pan half for covering the bottom pan half, and if a person desires only a pan half for cooking without a top half, it is only necessary to purchase one pan half and not the entire double roasting pan.

Although the present invention has been described and illustrated with respect to a preferred embodiment and a preferred use therefor, it is not to be so limited since modifications and changes can be made therein which are within the full intended scope of the invention.

I claim:

1. A double roasting pan comprising a first pan half and a second pan half, said first pan half and said second pan half being identical in construction and fitted together to form the double roasting pan with one of said pan halves being used as the top pan of the roasting pan and the other being used as the bottom pan of the roasting pan and with the first and second pan halves being used interchangeably as the top pan or the bottom pan of the roasting pan, each of said pan halves comprising:

(a) a body portion having a first end and an opposite second end, and having a first side and a opposite second side, said body portion including:
  i. a panel portion having an edge therearound,
  ii. a skirt portion attached to said panel around the edge thereof, extending away from said panel and terminating in an open mouth portion;

(b) a rim attached to said body portion adjacent and around said mouth portion, said rim having oppositely facing first and second surfaces, having a first rim portion on said first side of said body portion, a second rim portion on said second side of said body portion, a third rim portion on said first end of said body portion, and a fourth rim portion on said second end of said body portion;

(c) a first protrusion attached to said first rim portion and extending outwardly from said second surface of said first rim portion;

(d) a second protrusion attached to said second rim portion extending outwardly from said second surface of said second rim portion;

(e) a first recess in said first rim portion extending outwardly from said second surface of said first rim portion;

(f) a second recess in said second rim portion extending outwardly from said second surface of said second rim portion;

said first and second protrusions being disposed diagonally from one another relative to said body portion; said first and second recesses being disposed diagonally from one another relative to said body portion; said first protrusion and said first recess being spaced apart, said second protrusion and said second recess being spaced apart substantially the same distance as the spacing between said rest protrusion and said first recess; said first recess said second protrusion said rest protrusion and said second recess being respectively space from both said first and second ends of said body portion, said first recess and said second protrusion being spaced substantially an equal distance from said first end of said body portion, said first protrusion and said second recess being spaced substantially an equal distance from said second end of said body portion; the distance of said first recess and said second protrusion from said first end of said body portion being substantially the same as the distance of said first protrusion and said second recess from said second end of said body portion; and said first and second pan halves of said double roasting pan having the respective second surfaces of the rims thereof engaging one another along a single straight flat plane.

2. The double roasting pan of claim 1 in which said protrusions on said first and second pans are respectively tapered and said recesses on said first and second pans are respectively correspondingly tapered, and said protrusions on said first pan half and said protrusions on said second pan half respectively extend into the recesses in said second pan half and first pan half to prevent shifting of said first and second pans relative to one another.

3. The double roasting pan of claim 2 in which each of said pan halves includes first and second rigid handles respectively fixedly mounted on said third rim portion and said fourth rim portion of each of said pan halves, each of said handles including:

(a) a vertically extending portion fixedly attached to said rim;

(b) an outwardly extending flange fixedly attached to said vertically extending portion and extending outwardly therefrom;

said outwardly extending flanges of said handles mounted on said third rim portions of said first and second pans being spaced apart and said outwardly extending flanges of said handles mounted on said fourth rim portions of said first and second pan halves being similarly spaced apart to allow room for picking up the top pan by the handles thereon, and to allow the handles on bottom pan to be used to pick up either the bottom pan separately or the bottom and top pans together.

4. The double pan of claim 1 in which said protrusions on said first and second pans are respectively conically shaped, said recesses on said first and second pans are respectively correspondingly conically shaped, and the shape of said protrusions on said first pan half and said protrusions on said second pan half respectively interact with the shape of the recesses in said second pan half and said first pan half to move the pan halves into exact alignment.

5. The double roasting pan of claim 1 in which the area of said protrusion and the area of said recess on each of the sides of said first and second pans together occupy a minor portion of each of the sides of said first and second pans.

6. A first roasting pan half adapted to be used alone or adapted to be fitted together with a second identical roasting pan half to establish a double roasting pan, said first roasting pan half comprising:

(a) a body portion having a first end and an opposite second end, and having a first side and a opposite second side, said body portion including:
      i. a panel portion having an edge there around,
      ii. a skirt portion attached to said panel portion around the edge thereof, extending away from said panel and terminating in an open mouth portion;
   (b) a rim attached to said body portion adjacent and around said mouth portion, said rim having oppositely facing first and second surfaces, having a first rim potion on said first side of said body portion, a second rim portion on said second side of said body portion, a third rim portion on said first end of said body portion, and a fourth rim portion on said second end of said body portion;
   (c) a first protrusion attached to said first rim portion extending outwardly from said second surface of said first rim portion;
   (d) a second protrusion attached to said second rim portion extending outwardly from said second surface of said second rim portion;
   (e) a first recess in said first rim portion and extending outwardly from said second surface of said first rim portion;
   (f) a second recess in said second rim portion extending outwardly from said second surface of said rim portion; said first and second protrusions being axially symmetrical relative to said body portion; said first recess, said second protrusion, said first protrusion, and said second recess being respectively spaced from both said first and second ends of said body portion; and when said first roasting pan half is fitted with said second roasting pan half to establish the double roasting pan, said first and second pan halves of said double roasting pan having the respective second surfaces of the rims thereof engaging one another along a single straight flat plane.

7. The pan half of claim 6 in which said rim includes a rim base portion outwardly extending from said edge of said body portion, and a circumferential lip portion attached to said base portion in spaced relationship to said body portion.

8. The pan half of claim 7 which includes first and second rigid handles respectively fixedly mounted on said third rim portion and said fourth rim portion, each of said handles including:

(a) a vertically extending portion attached to said rim, and
   (b) an outwardly extending flange attached to said vertically extending portion and extending outwardly therefrom.

9. The double roasting pan of claim 6 in which said protrusions on said first and second pans are respectively conically shaped, said recesses on said first and second pans are respectively correspondingly conically shaped, and the shape of said protrusions on said first pan half and said protrusions on said second pan half, when said first roasting pan half is fitted with said second pan half to establish the double roasting pan, respectively interact with the shape of the recesses in said second pan half and said first pan half to move the pan halves into exact alignment.

10. The double roasting pan of claim 9 in which the area of said protrusion and the area of said recess on each of the sides of said first and second pans together occupy a minor portion of each of the sides of said first and second pans.

11. The double roasting pan of claim 6 in which the area of said protrusion and the area of said recess on each of the sides of said first and second pans together occupy a minor portion of each of the sides of said first and second pans.

* * * * *